May 6, 1958     Z. J. CAMPIAN     2,833,171
HOSE CLAMP TIGHTENER
Filed Nov. 18, 1955
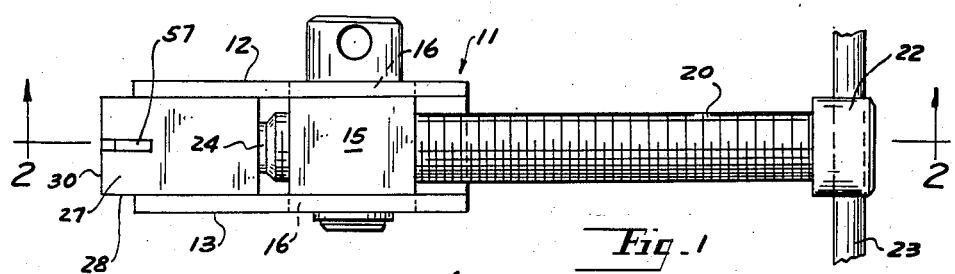
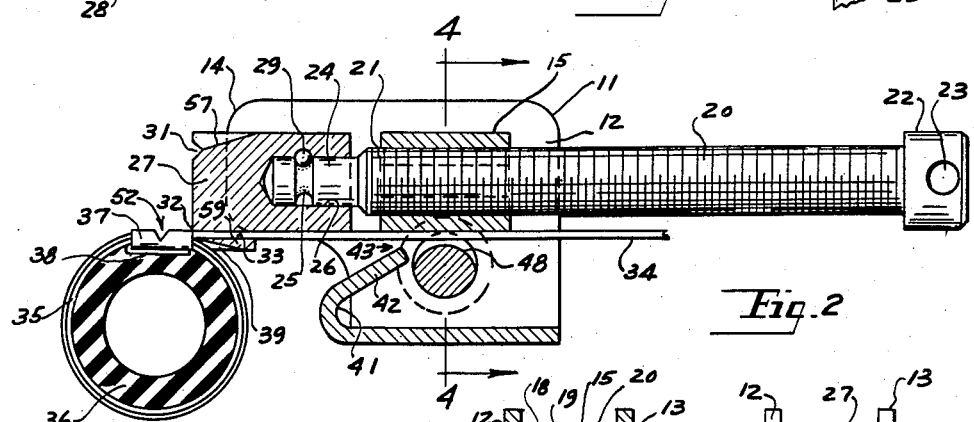
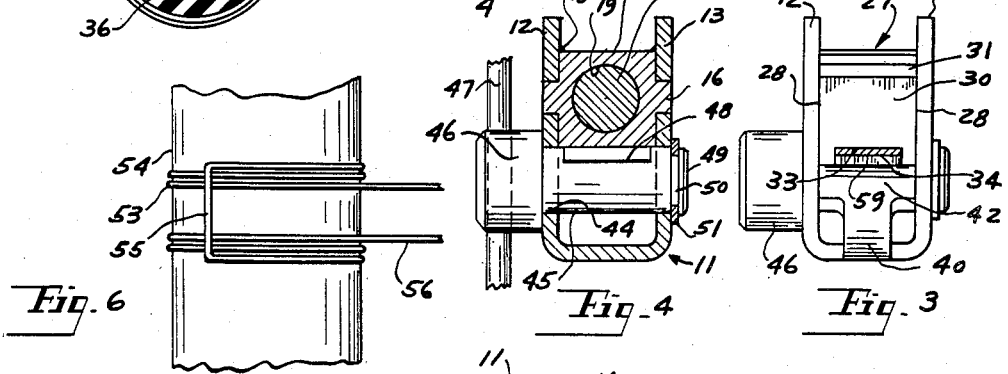
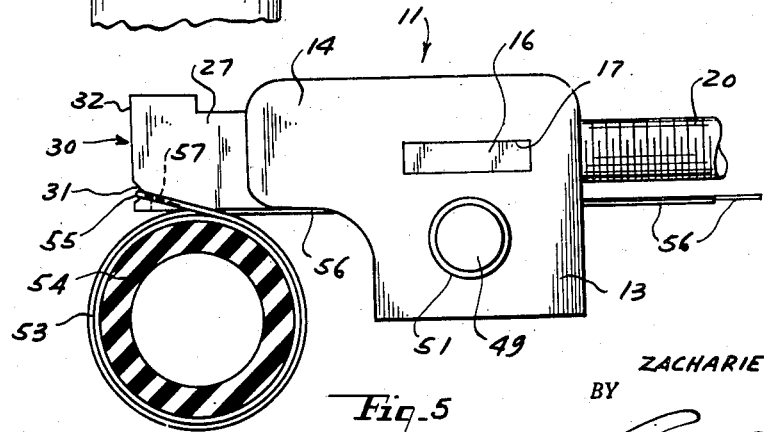
INVENTOR.
ZACHARIE J. CAMPIAN
BY
Robert A. Sloman
ATTORNEY

2,833,171
HOSE CLAMP TIGHTENER
Zacharie J. Campian, Detroit, Mich.

Application November 18, 1955, Serial No. 547,746

4 Claims. (Cl. 81—9.3)

This invention relates to a clamp tightener, and more particularly to a device adapted for tightening clamps around cylindrical objects such as a hose or conduit.

Heretofore, various types of clamp constructions have been employed for tightening strap type of clamps. Also, various clamp tighteners have been provided for tightening wire types of clamps around cylindrical objects.

It is the primary object of the present invention to incorporate in a unitary structure a clamp tightener which may be easily adapted either for tightening the leaf type of hose clamp or the wire type of clamp.

It is the further object of the present invention to provide in the present clamp tightening device efficient means for operatively engaging the stationary portion of the clamp to be tightened and locking means for retainingly engaging the movable portion of the clamp to be tightened.

These and other objects will be seen from the following specification and claims in conjunction with the appended drawing, in which:

Fig. 1 is a plan view of the present clamp tightener with a portion of the handle broken away.

Fig. 2 is a section taken on line 2—2 of Fig. 1.

Fig. 3 is a left side elevational view of the tightener.

Fig. 4 is a fragmentary section taken on line 4—4 of Fig. 2.

Fig. 5 is a side elevational view of the tightener as adapted for tightening a wire type of clamp and with the operating shaft partially broken away; and Fig. 6 is a fragmentary plan view of a wire type of clamp as positioned for use in conjunction with the tightener shown in Fig. 5.

It will be understood that the above drawing illustrates merely a preferred embodiment of the invention and that other embodiments are contemplated within the scope of the claims hereafter set forth.

The present clamp tightener comprises an elongated upright U-shaped body 11 with upright side walls 12 and 13, which includes the forward overhanging extension 14, Fig. 2.

An elongated nut 15 is suitably secured within said body as by the welds 18, Fig. 4. In the present embodiment, the said nut includes upon its opposite sides the elongated lateral projections 16 which are nested within corresponding slots 17 formed in the respective side walls of the body to further anchor the said nut.

The nut, longitudinally thereof, has an interiorly threaded bore 19 adapted to receive the threaded end 21 of the manually rotative shaft 20.

The socket 22 is threaded upon the outer end of shaft 20 and there is provided therethrough the transverse normally slidable conventional lever 23 to facilitate rotation of shaft 20 as one method of activating said shaft.

The forward end of shaft 20 is of reduced diameter as at 24 and rotatively projects within slot 26 in the block 27 which is of rectangular cross-section and which is slidably positioned between side walls 12 and 13 within the said body and which is adapted for relative longitudinal movements with respective to said body.

Shaft extension 24 has an annular slot 25 therein, a portion of which is adapted to retainingly receive the transverse securing pin 29 which projects through the said block 27. Accordingly, said block is swivelly mounted upon shaft 20 and is adapted for longitudinal movements in one direction or the other with respect to said body upon rotation of shaft 20 in one direction or the other.

The forward portion of block 27 extends forwardly of body 11 as at 28 and terminates in the right angularly related upright end face 30 which, as shown in Fig. 2, is adapted at its lower edge, for example, at 32, to operatively engage the stationary portion of the hose clamp body 37.

Across the said end face 30 of said block at its opposite upper edge there is provided a slot 31 preferably of V-shaped cross-section which is adapted when the said block has been rotated 180 degrees to the position shown in Fig. 5 to operatively receive the bight 55 of the wire type of clamp shown in Fig. 6.

Referring to Fig. 2, the clamp 37 has anchored thereto the reverse turned preferably metallic strap 38, the other portions of which are wound as at 35 around the conduit 36 which, in the present illustration, is a rubber hose. The free end portion of the strap of said clamp extends through the housing portion 37 of the clamp and projects along the undersurface of block 27 at the same time as the forward end face thereof at point 32 retainingly engages a portion of the said clamp body 37.

The free end portion of said strap as at 34 projects into slot 33 longitudinally through the body 11 below nut 15 and above the manually rotative cam locking structure 48.

The undersurface of block 27 has a tapered cut away portion 39, Fig. 2, to provide additional clearance for the looped portion of the hose clamp as shown in the drawing.

The bottom wall of body 11 towards its forward end is cut away so as to be of reduced thickness shown at 40, Fig. 3, and this portion is reverse turned as at 41 and inclined upwardly and rearwardly as at 42 extending towards nut 15 and spaced therefrom at its upper edge to define the entrant opening 43 into which the free end 34 of the clamp strap is manually projected.

The side walls of said body are transversely apertured at 44 for rotatively receiving and supporting the shaft 45 which has an enlarged head 46 on one end thereof upon the exterior of wall 12 and which receives the conventional transverse operating lever 47 which is broken away in Fig. 4.

Within the said body, shaft 45 includes the cam surface 48 which is normally spaced from the undersurface of nut 15 and adapted upon rotation of shaft 45 for movemnet towards and away from said nut. By this construction the cam surface 48 will operatively and retainingly engage free end portion 34 of the strap, forming a part of the hose clamp 37, when the clamp is ready for use.

The cam shaft extends through the second side wall 13 of the body terminating at 49 and has formed therein an annular recess 50 adjacent side wall 13 for receiving the snap locking ring 51. By this construction, cam shaft 45 is retained against longitudinal movement relative to body 11, but is free for rotary movement.

As shown in Fig. 2, by rotation of shaft 20 in a clockwise direction, for example, and with the head 27 engaging the clamp 37 along its lower edge as at 32, and with the cam surface 48 tightly gripping the strap 34 of said clamp, there will be effected a relative longitudinal movement of the said block 27, in effect drawing up the strap 34 with respect to the hose 36. When this has been tightened sufficiently, the retainer 37 of the said clamp is punched inwardly as at 52 to thereby lock the strap 34 with respect thereto, after which the tightening device may be removed on loosening of locking cam 48.

The present tightener is also adapted for tightening around the conduit 54, for illustration, Fig. 6, of a wire type of clamp 53 which extends around the said conduit defining the bight 55, as well as the free ended wire extensions 56. In comparing the illustration of Fig. 6 with Fig. 2, the said bight corresponds to clamp element 37, whereas the free ends correspond to the strap 34.

To effect the tightening operation of wire clamp 53, the shaft 20 is initially rotated clockwise sufficiently as to move block 27 outside of the housing. The block is then rotated manually 180 degrees and upon rotation of shaft 20 in the opposite direction, the said block 27 will be returned, such as to the position shown in Fig. 5. Here the transverse slot 31 in the end face of said block is upon the bottom of the block and cooperatively receives the bight 55 of the wire clamp. At the same time the free ends as at 56 extend along the bottom of block 27 and into housing 11 through the entrant opening 43, Fig. 2, and in between the nut 15 and the locking cam 48 in the manner shown in Fig. 2. The same procedure is repeated, i. e., upon tightening of the cam lock, rotation of shaft 20 in a clockwise direction will effect the tightening of the wire clamp, after which the free ends must be tied down to the body of the wire clamp in a conventional manner.

In order to accommodate a bight 55 of less width than that shown in Fig. 6, there is formed intermediate the side walls of block 27 a tapered slot 57 which runs out into the top wall of the block shown in Fig. 1 and at its forward end merges with the base of the transverse V slot 31.

The slot 33, Fig. 3, which receives strap end 34, is bounded by the bottom wall 59 which, as shown in Fig. 2, is tapered at its under surface at 39.

Having described my invention, reference should now be had to the claims which follow for determining the scope thereof.

I claim:

1. A hose clamp tightener comprising an elongated upright U-shaped body, an elongated nut secured within said body intermediate its opposite ends and adjacent its upper open side, with its axis extending along the length of the body, an elongated manually rotative shaft extending longitudinally into said body threadedly engaging said nut, a block of rectangular cross-section slightly longer than its width slidably positioned between and engaging throughout its height the side walls of said body and swivelly joined to the end of said shaft and longitudinally adjustable in said body on rotation of said shaft, and having a right angularly related end face projecting longitudinally from the body adapted to retainingly engage a portion of a clamp to be tightened around a cylindrical object, and a manually rotative cam within and extending across said body between its side walls and below said nut, its cam surface adapted on rotation for transverse movements towards and away from said nut adapted for gripping therebetween the free end of a movable portion of said clamp.

2. The clamp of claim 1, the undersurface of said block being slotted adjacent said end face for guidably receiving said free end as it projects into said body.

3. The clamp of claim 1, there being a horizontally disposed transverse slot formed in said end face adjacent the top surface of said block whereby said block on 180 degree rotation thereof may be adjustably secured in said body for retainingly engaging the bight of a wire type of clamp.

4. The clamp of claim 1, the bottom wall of said body having an extension at its forward end reverse turned and extending angularly upward and rearward within said body towards said nut with its end spaced therefrom defining an entrant passageway for the said free end of the clamp to be tightened.

References Cited in the file of this patent

UNITED STATES PATENTS

| | | |
|---|---|---|
| 1,001,321 | Strong | Aug. 22, 1911 |
| 1,990,820 | Flader | Feb. 12, 1935 |
| 2,334,637 | McKee | Nov. 16, 1943 |
| 2,746,324 | Beardsley | May 22, 1956 |